(12) United States Patent
Lee et al.

(10) Patent No.: US 8,287,412 B2
(45) Date of Patent: Oct. 16, 2012

(54) HYBRID POWER TRAIN OF VEHICLE

(75) Inventors: Kyungshin Lee, Gyeonggi-do (KR);
Buhmjoo Suh, Gyeonggi-do (KR);
Hyunsoo Kim, Gyeonggi-do (KR);
Jeongmin Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 318 days.

(21) Appl. No.: 12/571,738

(22) Filed: Oct. 1, 2009

(65) Prior Publication Data
US 2010/0081533 A1    Apr. 1, 2010

(30) Foreign Application Priority Data
Oct. 1, 2008  (KR) .................. 10-2008-0096396

(51) Int. Cl.
*F16H 3/72*    (2006.01)
(52) U.S. Cl. ............................ 475/5; 475/311
(58) Field of Classification Search ............... None
See application file for complete search history.

(56) References Cited

U.S. PATENT DOCUMENTS
2006/0189428 A1    8/2006   Raghavan et al.
2007/0042852 A1*   2/2007   Bucknor et al. .................. 475/5

FOREIGN PATENT DOCUMENTS
| JP | 2005-067319 A | 3/2005 |
| JP | 2006-282069 A | 10/2006 |
| JP | 2008-056236 A | 3/2008 |
| JP | 2008-120138 A | 5/2008 |
| KR | 10-2006-0108004 | 10/2006 |
| KR | 10-2008-0022724 | 3/2008 |
| KR | 10-0836291 B1 | 6/2008 |

* cited by examiner

*Primary Examiner* — David D Le
*Assistant Examiner* — Erin D Bishop
(74) *Attorney, Agent, or Firm* — Edwards Wildman Palmer LLP; Peter F. Corless

(57) ABSTRACT

The present invention makes it possible to implement various stepped gear modes and a compound split type hybrid mode in a relatively simple structure using two planetary gear sets and two motor generators, reduce fuel consumption of a vehicle in a relatively large section, minimize fuel consumption at a high speed by implementing an overdrive stepped gear mode, and improve acceleration performance and gradient performance of the vehicle by implementing an underdrive stepped gear mode.

5 Claims, 8 Drawing Sheets

FIG.2

| MODE | CL1 | CL2 | BK1 |
|---|---|---|---|
| EV | ● | | |
| HEV1 | ● | | |
| HEV2 | | ● | |
| U1 | | ● | ● |
| U2 | ● | ● | |
| U3 | ● | | ● |

HYBRID POWER TRAIN OF VEHICLE

CROSS-REFERENCE TO RELATED APPLICATIONS

The present application is based on, and claims priority from, Korean Application Serial Number 10-2008-0096396, filed on Oct. 1, 2008, the disclosure of which is hereby incorporated by reference herein in its entirety.

TECHNICAL FIELD

The present invention relates to a hybrid power train of a vehicle that can join the power of an engine and two motor generators and transmit the power to the driving wheels of the vehicle.

BACKGROUND

A hybrid power train using a planetary gear set and two motor generators together with en engine can achieve the function of a continuously variable transmission, which is electrically operated, without a transmission, by controlling the speed of the motor generators. Further, it is possible to implement a motor mode, an engine mode, a hybrid mode, and a regenerative braking mode, etc. by controlling the speed of the motor generators and it is possible to control the engine to be turned on/off, if needed, thereby decreasing fuel consumption. Furthermore, it is possible to increase efficiency of regenerative braking by minimizing use of a friction brake in braking.

In an input type power train for a hybrid electric vehicle using two motor generators, one of two motor generators is fixedly connected directly or through a decelerator to an output shaft. The power train has the best efficiency at a deceleration ratio that creates a mechanical point where the speed of the other motor generator, which is not directly connected to the output shaft, is zero. The efficiency is decreased when the deceleration ratio decreases or increases from the above level. The efficiency decrease when the deceleration ratio decreases is significantly larger than when the deceleration ratio increases. That is, as the deceleration ratio decreases under the mechanical point (as vehicle speed increases), the efficiency of the power train rapidly decreases.

On the other hand, in a compound split type power train for a hybrid electric vehicle using two motor generators, both motor generators are not directly connected to an output shaft or an input shaft, but separately connected to rotary components of a planetary gear set. According to this power train, one mechanical point in the two motor generators can be created at a deceleration ratio that is smaller than that of the input split type, such that the power train can ensure high efficiency of the power train in relatively high-speed driving, but is disadvantageous in efficiency at relatively low speed due to power recirculation.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a hybrid power train of a vehicle that can reduce fuel consumption of a vehicle in a relatively large section, minimize fuel consumption at a high speed by implementing an overdrive stepped gear mode, and improve acceleration performance and gradient performance of the vehicle by implementing an underdrive stepped gear mode, by implementing stepped gear modes and a compound split type hybrid mode in a relatively simple structure with a small number of parts.

A hybrid power train of a vehicle including an engine, a first motor generator, and a second motor generator, in one aspect of the present invention, comprises: a first planetary gear set which includes a first rotary component, a second rotary component, and a third rotary component; a second planetary gear set which is operatively linked with the first planetary gear set and includes a first rotary component, a second rotary component, and a third rotary component. The first rotary components of the first and second planetary gear sets are variably connected with each other and the third rotary components thereof are fixedly connected with each other. The first, second, and third rotary components of the first planetary gear set are respectively connected to the second motor generator, the engine, and the first motor generator. The second and third rotary components of the second planetary gear set are variably connected with each other and respectively connected to an output shaft and the first motor generator. The first rotary component of first planetary gear set is connected to a first brake.

In an embodiment, the first, second, and third rotary components of the first planetary gear set may be a first sun gear, a first carrier, and a first ring gear, respectively, and the first, second, and third rotary components of the second planetary gear set may be a second ring gear, a second carrier, and a second sun gear, respectively.

A hybrid power train of a vehicle including an engine, a first motor generator, and a second motor generator, in another aspect of the present invention, comprises: a first planetary gear set that includes three rotary components, one of the components being connected to the engine and one of the other components being connected to the second motor generator; a second planetary gear set that includes three rotary components, one of the components being connected to an output shaft of the vehicle and one of the other components being connected to the first motor generator; a first clutch that variably connects the rotary component of the second planetary gear set that is connected to the output shaft with the rotary component of the second planetary gear set that is connected to the first motor generator; a second clutch that variably connects the other rotary component of the second planetary gear set than the rotary components connected to the output shaft and the first motor generator with the rotary component of the first planetary gear set that is connected with the second motor generator; and a first brake that is disposed to change rotational restriction of the rotary component of the first planetary gear set that is connected to the second motor generator, with respect to a fixed member. The other rotary component of the first planetary gear set than the rotary components that are connected to the second motor generator and the engine is integrally connected with the rotary component of the second planetary gear set that is connected to the first motor generator.

In an embodiment, the rotary component of the first planetary gear set that is connected to the second motor generator may be a first sun gear. The rotary component of the first planetary gear set that is connected to the engine may be a first carrier. The rotary component of the first planetary gear set other than the rotary components that are connected to the second motor generator and the engine may be a first ring gear, The rotary component of the second planetary gear set that is connected to the first motor generator may be a second sun gear. The rotary component of the second planetary gear set that is connected to the output shaft may be a second carrier. The rotary component of the second planetary gear set other than the rotary components that are connected to the first motor generator and the output shaft may be a second ring gear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

For better understanding of the nature and objects of the present invention, reference should be made to the following detailed description with the accompanying drawings, in which:

FIG. 2 is a table showing operation states of a clutch and a brake for operation modes of the power train shown in FIG. 1;

DETAILED DESCRIPTION OF EMBODIMENTS

Figure 1:
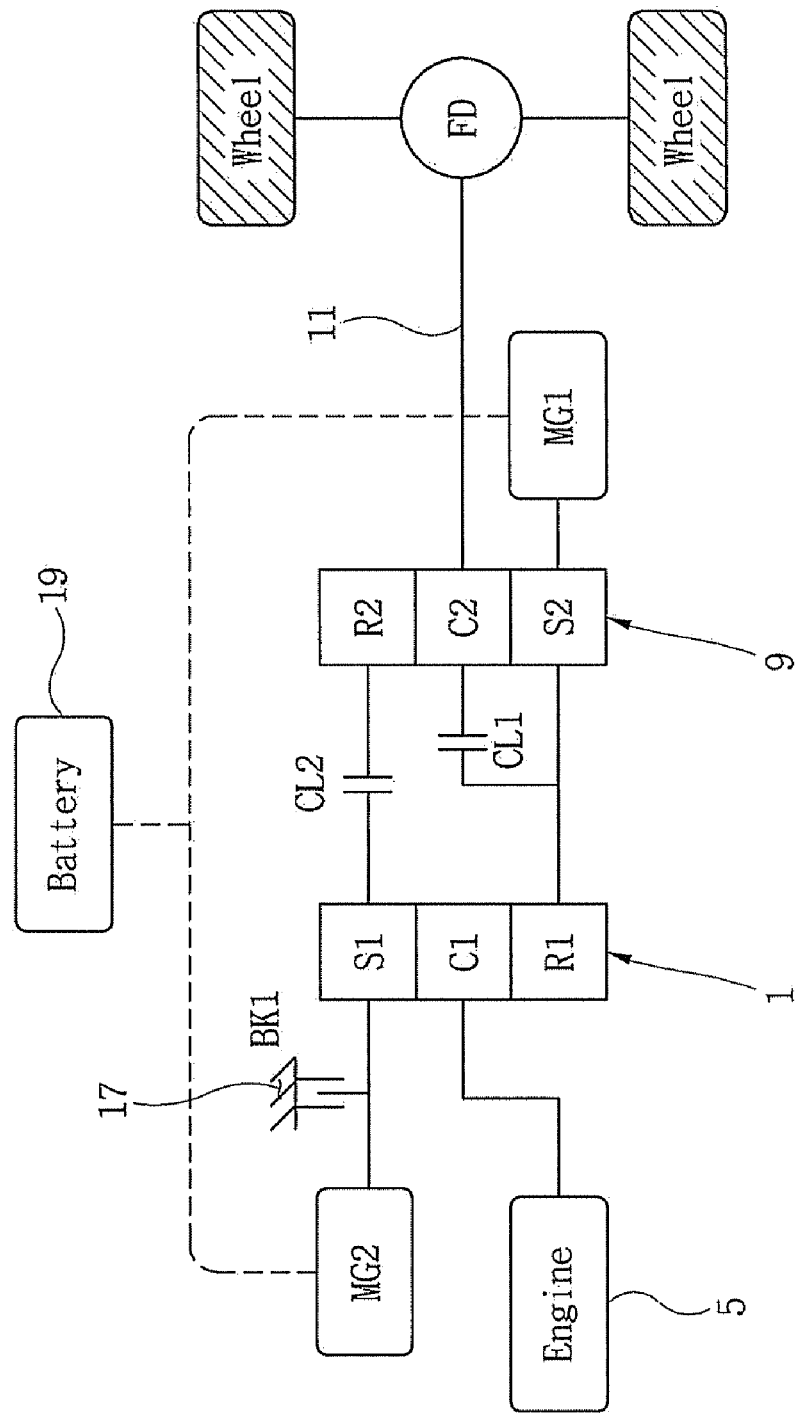
FIG. 1 is a view illustrating a hybrid power train of a vehicle according to an embodiment of the present invention.

Referring to FIG. 1, a hybrid power train for a vehicle including an engine 5, a first motor generator MG1 and a second motor generator MG2, according to an embodiment of the present invention, includes a first planetary gear set 1 and a second planetary gear set 9 operatively connected to the first planetary gear set 1. The first planetary gear set 1 includes a first rotary component, a second rotary component, and a third rotary component, which are a first sun gear S1, a first carrier 1, a first ring gear R1, respectively. The second planetary gear set 9 includes a first rotary component, a second rotary component, and a third rotary component, which are a second ring gear R2, a second carrier 2, a second sun gear S2, respectively. The first rotary components of the first and second planetary gear sets are variably connected with each other and the third rotary components thereof are fixedly connected with each other. The first, second, and third rotary components of the first planetary gear set 1 are connected to the second motor generator MG2, the engine 5, and the first motor generator MG1, respectively. The second and third rotary components of the second planetary gear set 9 are variably connected with each other and connected to an output shaft 11 and the first motor generator MG1, respectively. On the other hand, the first rotary component of the first planetary gear set 1 is connected to a first brake BK1.

A first clutch CL1 that is variably connected with the second and third rotary components of the second planetary gear set 9 is disposed to change rotational restriction therebetween. All the rotary components of second planetary gear set 9 can rotate as one unit when the first clutch CL1 is engaged.

A second clutch CL2 that is variably connected with the first rotary component of the first planetary gear set 1 and the first rotary component of the second planetary gear set 9 is disposed to change rotational restriction therebetween.

Accordingly, the first sun gear S1, which is the first rotary component of the first planetary gear set 1, is connected to the second motor generator MG2, the second clutch CL2, and the first brake BK1. The first carrier C1, which is the second rotary component of the first planetary gear set 1 is connected to the engine 5. The first ring gear R1, which is the third rotary component of the first planetary gear set 1, is connected to the first motor generator MG1 through the second planetary gear set 9. The second ring gear R2, which is the first rotary component of the second planetary gear set 9, is connected to the first sun gear S1 through the second clutch CL2. The second carrier C2, which is the second rotary component of the second planetary gear set 9 is connected to the first clutch CL1 and the output shaft 11. The second sun gear S2, which is the third rotary component of the second planetary gear set 9, is connected to the first clutch CL1 and the first motor generator MG1.

The first brake BK1 is disposed to change rotational restriction of the first sun gear S1 of the first planetary gear set 1 with respect to a fixed member 17 that is not rotatable, such as a transmission case.

Further, the first motor generator MG1 and the second motor generator MG2 are connected to a battery 19 through an inverter (not shown), such that they charge the battery 19 or output mechanical rotational force by electric energy supplied from the battery 19.

Figure 2:
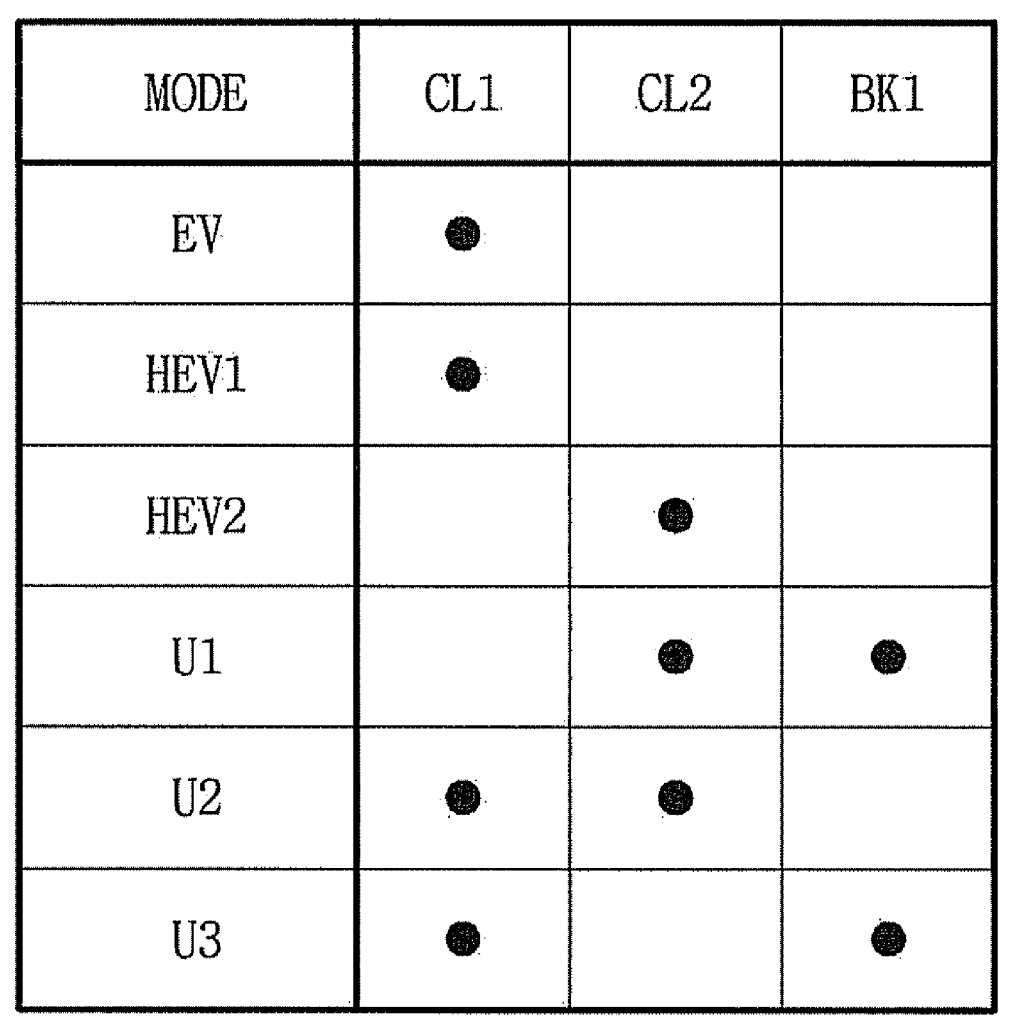

The hybrid power train can be operated in a plurality of modes. FIG. 2 is a table showing operation states of the first clutch CL1, the second clutch CL2, and the brake BK1 for the respective operation modes of the hybrid power train.

The operation of the hybrid power train of a vehicle is described with reference to FIGS. 2 and 8.

Figure 3:
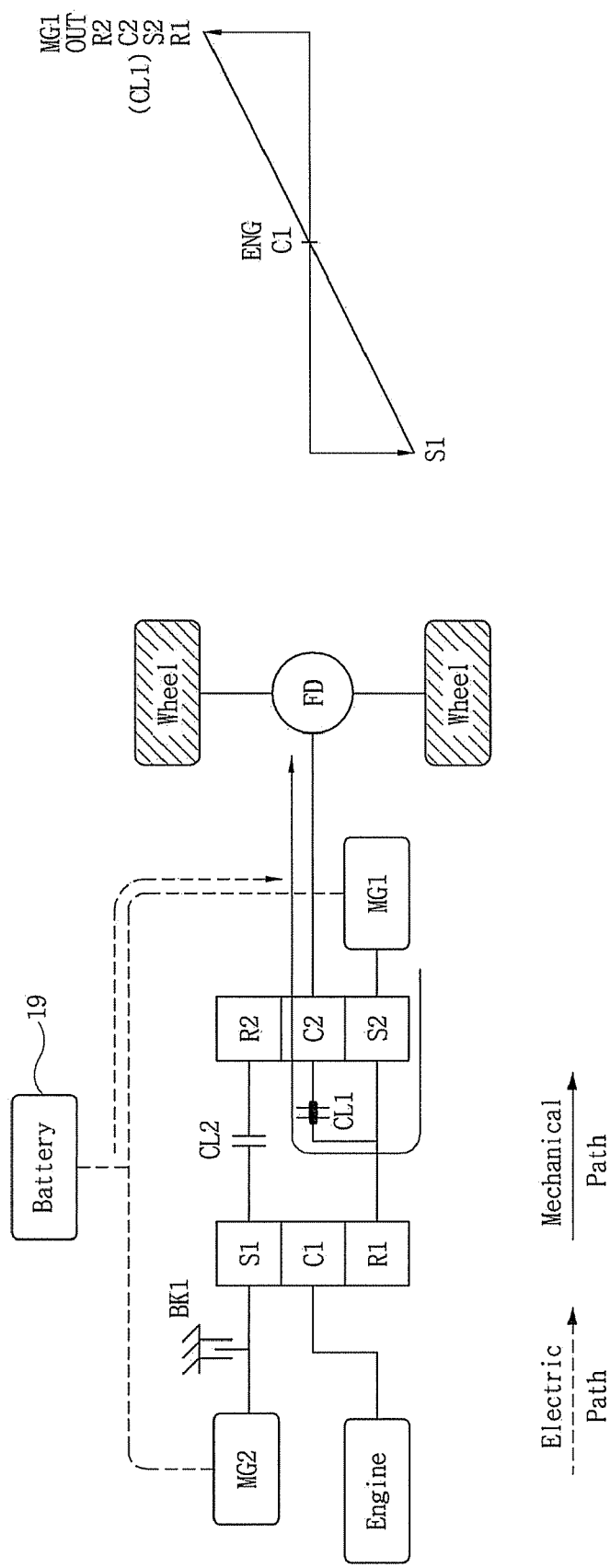
FIG. 3 is a view illustrating an electric vehicle mode of the power train shown in FIG. 1.

FIG. 3 illustrates when the hybrid power train is driven in an electrical vehicle EV mode, in which the first clutch CL 1 is engaged and, the second clutch CL2 and the first brake BK1 are both disengaged, as shown in FIG. 2.

Since the second sun gear S2 and the second carrier C2 of the second planetary gear set 9 are connected with each other by the first clutch CL1, all of the rotary components of the second planetary gear set 9 including the second ring gear R2 rotate as one unit, and the power is supplied from the first motor generator MG1.

In this operation, the engine 5 is in stop, the first carrier C1 of the first planetary gear set 1 is fixed, the first ring gear R1 connected to the second planetary gear set 9 rotates with the second planetary gear set 9, and the first sun gear S1 of the first planetary gear set 1 rotates with no-load.

That is, the vehicle has a natural electrical vehicle mode to be driven by power supplied from the first motor generator MG1 through the second planetary gear set 9, which is used for starting the vehicle.

Where the engine 5 is to be started in the above state, the speed of the engine 5 is increased by driving the second motor generator MG2 to a speed that allows for ignition. By the start of the engine 5, a first hybrid mode HEV1 is initiated.

Figure 4:
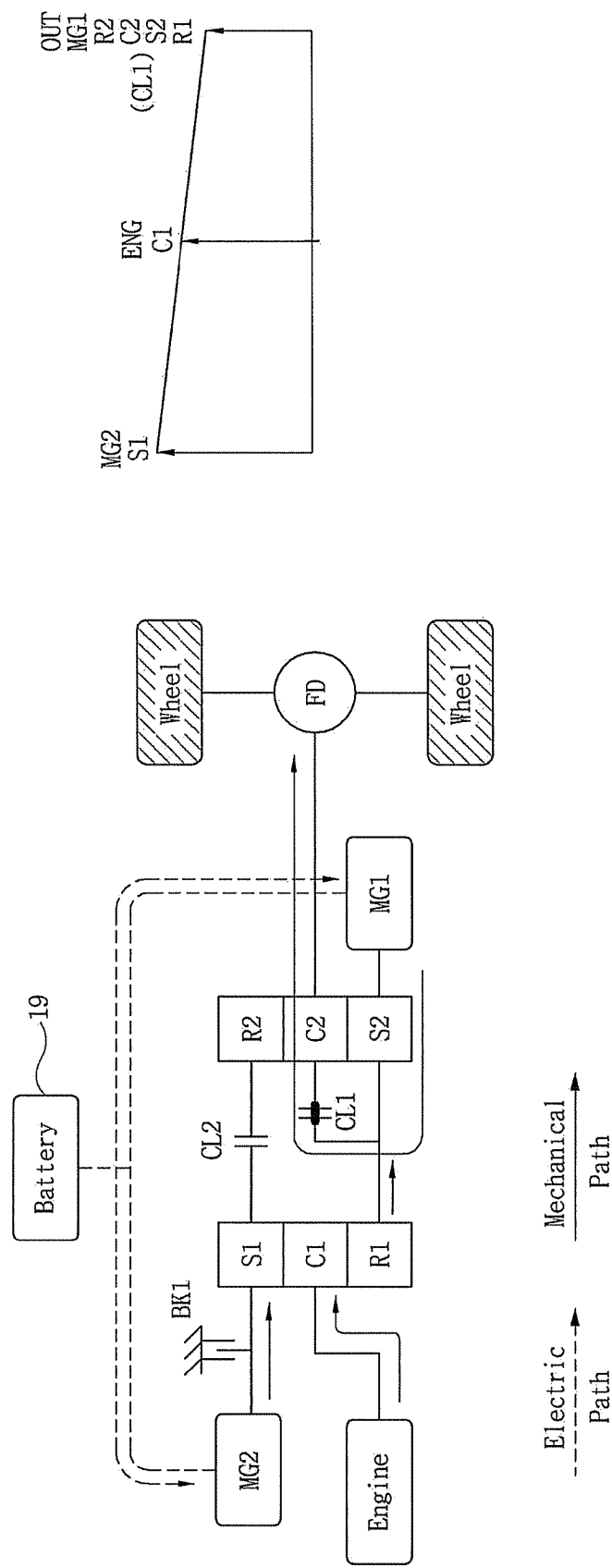
FIG. 4 is a view illustrating a first hybrid mode of the power train shown in FIG. 1.

FIG. 4 is a view illustrating the operation of the first hybrid mode HEV1, in which the first clutch CL1 is kept engaged and the second clutch CL2 and the first brake BK1 are kept disengaged, and as the power from the engine 5 is transmitted to the output shaft 11 through the first planetary gear set 1 and the second planetary gear set 9, the power is supplied to the output shaft 11 together with the power supplied through the first motor generator MG1.

In this state, since the first motor generator MG1 and the second motor generator MG2 can freely change the transmission gear ratio by performing motor operation and generating operation, respectively, an electronic continuously variably transmission can be implemented, in which since the first motor generator MG1 is directly connected to the output shaft 11, it supports the output of the engine 5 by performing motor operation, and the second motor generator MG2 changes the driving point of the engine 5 in addition to charging the battery 19 by performing generating operation.

Figure 5:
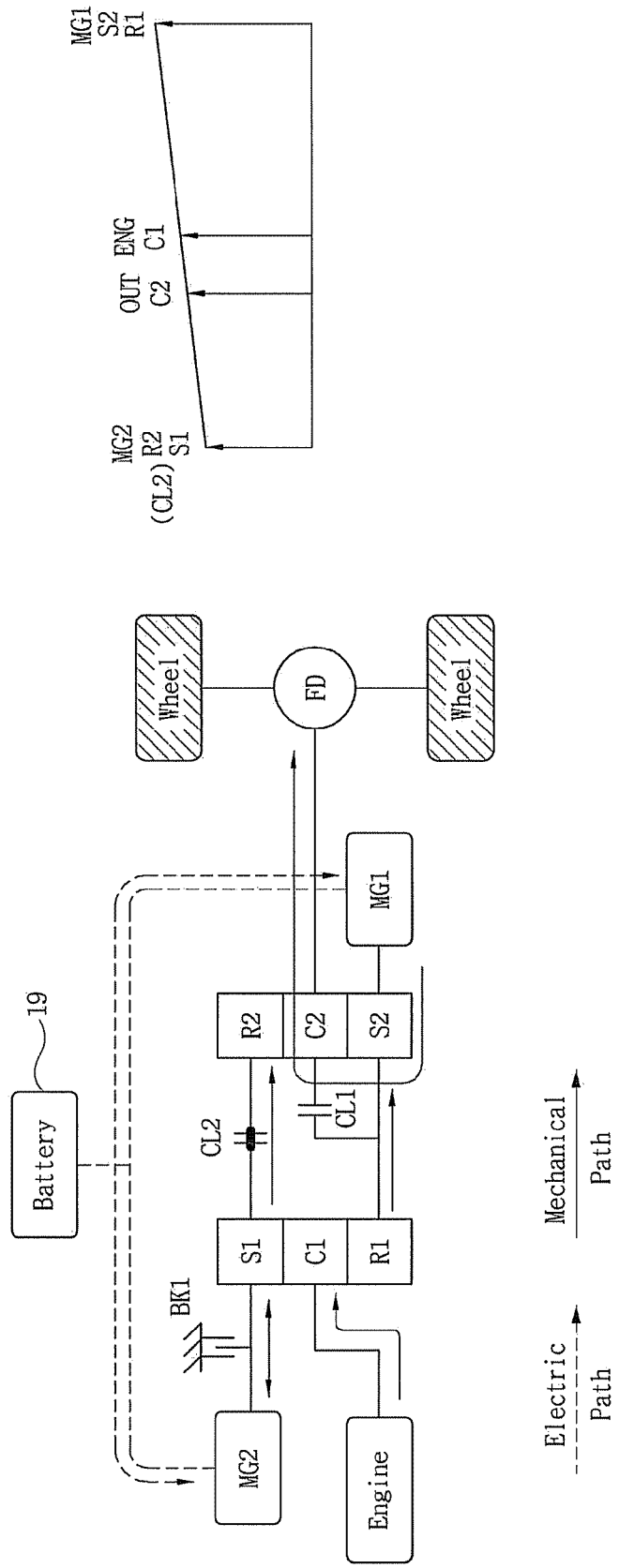
FIG. 5 is a view illustrating a second hybrid mode of the power train shown in FIG. 1.

FIG. 5 illustrates a second hybrid mode HEV2, in which if the vehicle travels in a transmission gear ratio section of low efficiency during the first hybrid mode HEV1, the vehicle can travel with high efficiency by converting the first hybrid mode HEV1 into the second hybrid mode HEV2.

In this mode, the first clutch CL1 and the first brake BK1 are disengaged and the second clutch CL2 is engaged. Accordingly, since both side components, that is, the second sun gear S2 and the second carrier C2 connected with the first clutch CL1 rotate as one unit at the same speed in HEV1, it is possible to convert HEV1 to HEV 2 without shift shock be disengaging the first clutch CL1. Further, the second hybrid mode HEV2 is implemented by engaging the second clutch CL2, using the generating operation of the second motor generator MG2, while controlling the second clutch CL2 such that a rotational speed difference is not generated between the first sun gear S1 and the second ring gear R2 at both sides of the second clutch CL2.

This state also implements an electronic continuously variably transmission that freely and continuously can change the transmission gear ratio by using motor operation and generating operation of the first motor generator MG1 and the second motor generator MG2.

That is, the hybrid power train of a vehicle allows a vehicle to travel at a high efficiency region by selectively using the first hybrid mode HEV1 and the second hybrid mode HEV2 that are compound split types, as described above.

Figure 6:
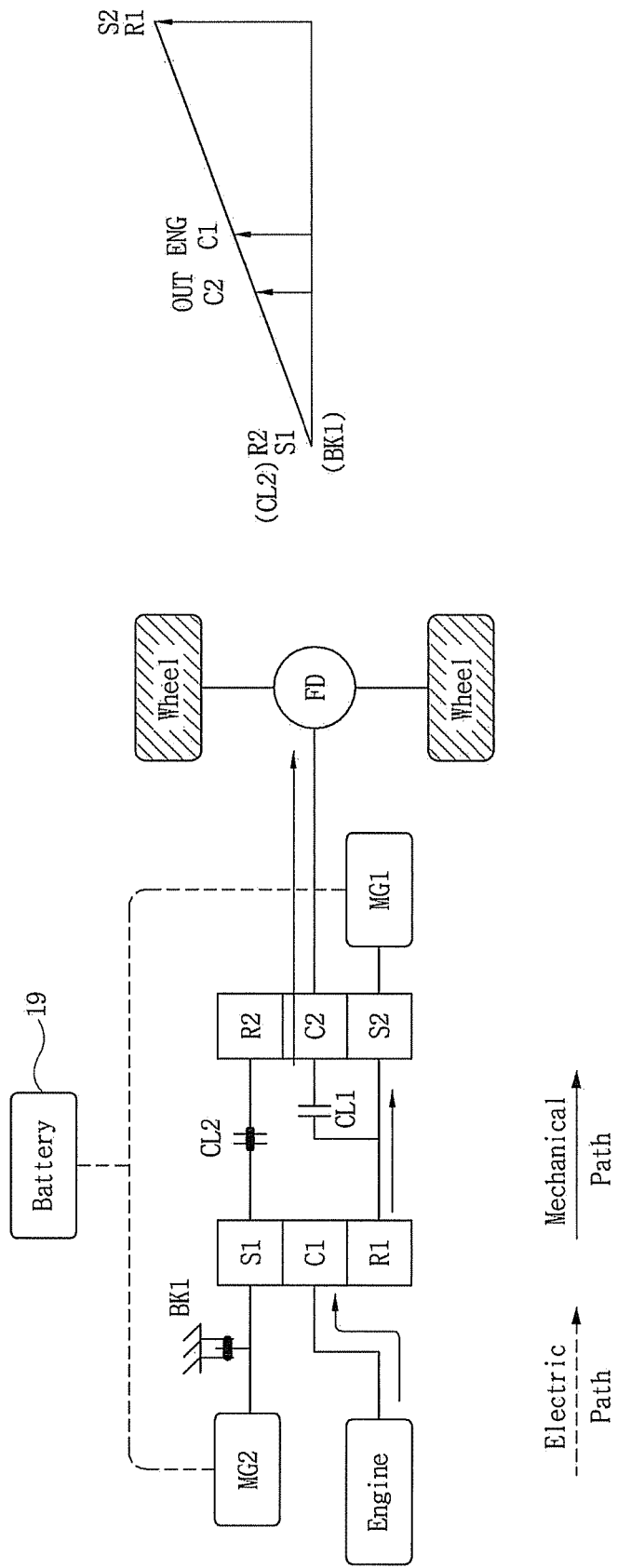
FIG. 6 is a view illustrating a first stepped gear mode of the power train shown in FIG. 1.

FIG. 6 shows a first stepped gear mode U1 that can be implemented by the hybrid power train, in which the first clutch CL1 is disengaged, and the second clutch CL2 and the first brake BK1 are engaged.

This state is implemented by removing a rotational speed difference of the first sun gear S1 and the second ring gear R2 while controlling the speed of the first motor generator MG1 and by engaging the second clutch CL2 in the first hybrid mode HEV1, and then adjusting the speed of the second motor generator MG2 to zero and then engaging the first brake BK1.

The output of the engine 5 is transmitted to the second planetary gear set 9 through the first carrier C1 and the first ring gear R1 of the first planetary gear set 1 and the second carrier C2 of the second planetary gear set 9 transmits the power to the output shaft 11.

In this operation, the first motor generator MG1 and the second motor generator MG2 do not need specific operations, such that the first motor generator MG1 rotates with no-load and the second motor generator MG2 is in stop. Further, two rotary components are directly connected with each other in each of the first planetary gear set 1 and the second planetary gear set 9, resulting in a one gear series having a constant transmission gear ratio. Accordingly, the power of the engine 5 is outputted at one constant transmission gear ratio produced by the first planetary gear set 1 and the second planetary gear set 9, which is referred to as a stepped gear mode.

Therefore, electric energy is not specifically provided between the first motor generator MG1, the second motor generator MG2, and the battery 19, and the vehicle is driven only by the mechanical power transmission by the power of the engine 5, such that it is possible to minimize energy loss without supplying and converting electric power.

The first carrier C1 of the first planetary gear set 1 and the second carrier C2 of the second planetary gear set 9 may have the same rotational speed or different rotational speeds according to the gear ratio of each of the planetary gear sets. The lever analysis diagram shown in FIG. 6 shows the first carrier C1 has a gear ratio to have a lower rotational speed than the second carrier C2, as an example.

That is, the power from the engine 5 is reduced by one transmission gear ratio produced by connection of the first planetary gear set 1 and the second planetary gear set 9 and outputted to the output shaft 11 through the second carrier C2.

Therefore, this state may be called an underdrive stepped gear mode, which can help improving acceleration performance and gradient performance of a vehicle.

Figure 7:
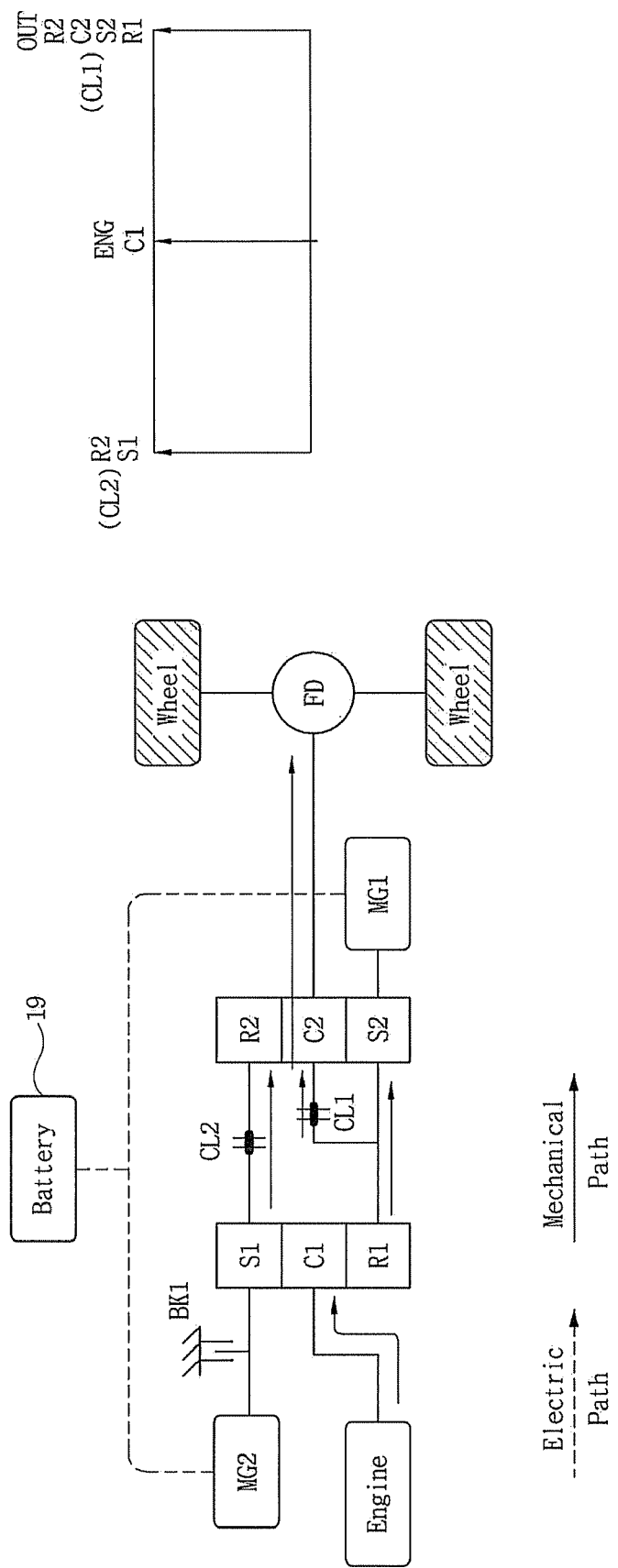
FIG. 7 is a view illustrating a second stepped gear mode of the power train shown in FIG. 1.

FIG. 7 illustrates a second stepped gear mode U2, which is implemented by controlling the rotational speed of the second sun gear S2 to be the same as the rotational speed of the output shaft 11 (that is, the rotational speed of the second carrier C2) while controlling the speed of the first motor generator MG1, and then engaging the first clutch CL1, when the vehicle travels at a velocity higher than a predetermined value.

As the first clutch CL 1 is engaged as described above, all the rotary components of the second planetary gear set 9 are integrally rotated and all the rotary components of the first planetary gear set 1 and the second planetary gear set 9 are rotated as one unit by the second clutch CL2 that has been engaged in the second hybrid mode HEV2.

That is, the power provided from the engine 5 is supplied only to the first carrier C1 of the first planetary gear set 1; however, since the first planetary gear set 1 and the second planetary gear set 9 rotate as one unit, the power of the engine 5 is directly connected to the output shaft 11 and outputted at a transmission gear ratio of 1:1.

Figure 8:
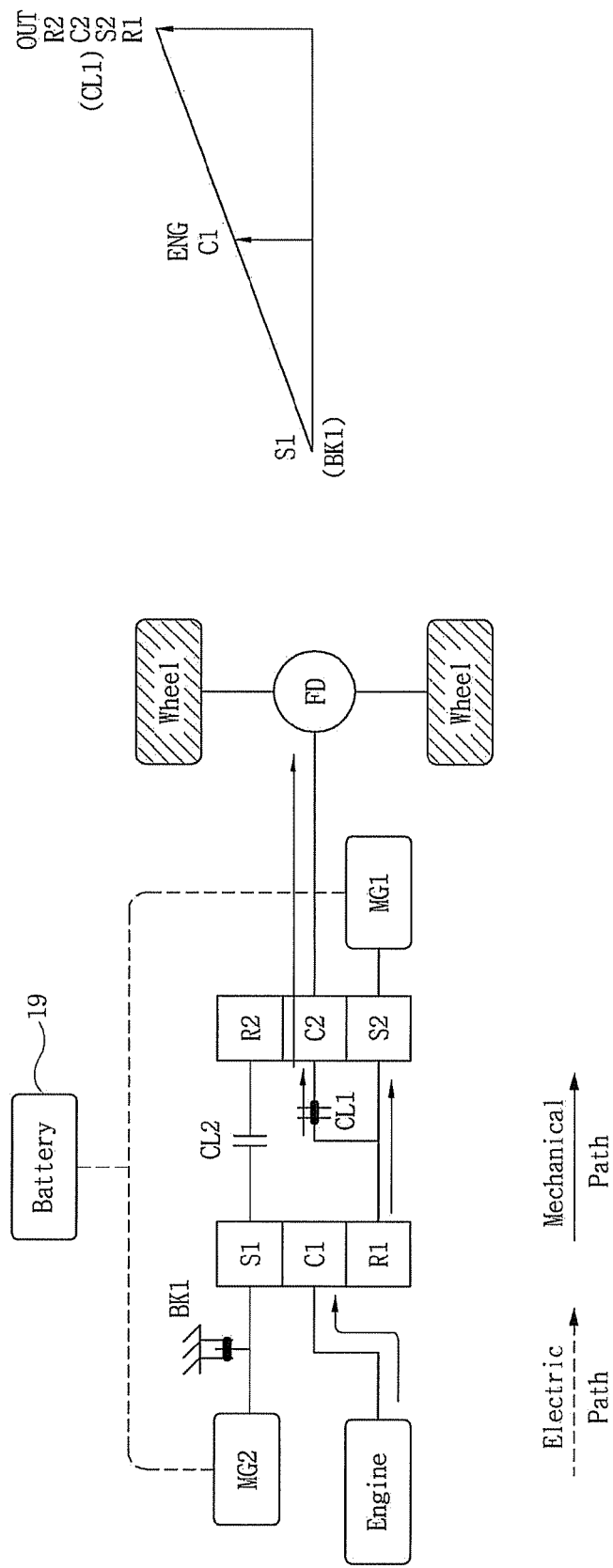
FIG. 8 is a view illustrating a third stepped gear mode of the power train shown in FIG. 1.

FIG. 8 illustrates a third stepped gear mode U3, which is implemented by disengaging the second clutch CL2 while traveling in the second hybrid mode HEV2, engaging the first brake BK1 by controlling the speed of the second motor generator MG2 to zero, and engaging the first clutch CL1 by controlling the first motor generator MG1 to the same speed as that of the output shaft 11.

Further, the third stepped mode U3 may be implemented by making the speed of the second motor generator MG2 to zero while traveling in the first hybrid mode HEV1 and then engaging the first brake BK1.

In this mode, all the rotary components of the second planetary gear set 9 make one rotary unit, the power of the engine 5 rotates the second planetary gear set 9 through the first carrier C1 and the first ring gear R1, and the first sun gear S1 is fixed by the first brake BK1; therefore, the power of the engine 5 is increased and outputted to the output shaft 11, thereby ensuring overdrive traveling.

As described above, the first motor generator MG1 and the second motor generator MG2 are also not electrically operated in the second stepped gear mode U2 and the third stepped gear mode U3 while the power of the engine 5 is outputted to the output shaft 11 at a constant transmission gear ratio without providing and converting electric energy. Therefore, it is possible to reduce energy loss and maximize the entire efficiency of the hybrid power train under high-speed traveling conditions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hybrid power train of a vehicle including an engine, a first motor generator, and a second motor generator, the hybrid power train comprising:
   a first planetary gear set which includes a first rotary component, a second rotary component, and a third rotary component;
   a second planetary gear set which is operatively linked with the first planetary gear set and includes a first rotary component, a second rotary component, and a third rotary component;
   wherein:
   the first rotary components of the first and second planetary gear sets are variably connected with each other and the third rotary components thereof are fixedly connected with each other, the first, second, and third rotary components of the first planetary gear set are respectively connected to the second motor generator, the engine, and the first motor generator, the second and third rotary components of the second planetary gear set are variably connected with each other and respectively connected to an output shaft and the first motor generator, and
   the first rotary component of first planetary gear set is connected to a first brake,
      wherein a first clutch that is variably connected with the second and third rotary components of the second planetary gear set is disposed to change rotational restriction between the second and third rotary components of the second planetary gear set, and
      a second clutch that is variably connected with the first rotary component of the first planetary gear set and the first rotary component of the second planetary gear set is disposed to change rotational restriction between the first rotary components, and
   the first brake, the first clutch, and the second clutch are configured such that disengagement of the first clutch together with engagement of the second clutch and the first brake provides an underdrive stepped gear mode, and disengagement of the second clutch together with engagement of the first clutch and the first brake provides an overdrive stepped gear mode.

2. The hybrid power train of a vehicle as defined in claim 1, wherein the first rotary component of the first planetary gear set is connected to the second motor generator, the second clutch, and the first brake,
   the second rotary component of the first planetary gear set is connected to the engine, and
   the third rotary component of the first planetary gear set is connected to the first motor generator through the second planetary gear set.

3. The hybrid power train of a vehicle as defined in claim 2, wherein the first rotary component of the second planetary gear set is connected to the first rotary component of
   the first planetary gear set through the second clutch,
   the second rotary component of the second planetary gear set is connected to the first clutch and the output shaft, and
   the third rotary component of the second planetary gear set is connected to the first clutch and the first motor generator.

4. The hybrid power train of a vehicle as defined in claim 1, wherein the first, second, and third rotary components of the first planetary gear set are a first sun gear, a first carrier, and a first ring gear, respectively and the first, second, and third rotary components of the second planetary gear set are a second ring gear, a second carrier, and a second sun gear, respectively.

5. The hybrid power train of a vehicle as defined in claim 1 wherein the first brake is configured such that engagement of the first brake provides for an overdrive stepped gear mode and an underdrive stepped gear mode.

* * * * *